United States Patent [19]

Linn et al.

[11] 4,381,506
[45] Apr. 26, 1983

[54] POSITION-ELECTRICAL SIGNAL TRANSDUCER

[75] Inventors: Karl-Otto Linn, Karlsruhe; Walter Jansche, Durmersheim; Dietrich Adolph, Albershausen; Artur Dannemann, Göppingen, all of Fed. Rep. of Germany

[73] Assignee: Robert Bosch GmbH, Stuttgart, Fed. Rep. of Germany

[21] Appl. No.: 215,347

[22] Filed: Dec. 11, 1980

[30] Foreign Application Priority Data

Jan. 23, 1980 [DE] Fed. Rep. of Germany ....... 3002233

[51] Int. Cl.³ ............................................. G08C 19/06
[52] U.S. Cl. ................................. 340/870.32; 324/208
[58] Field of Search ...................... 340/870.31, 870.32, 340/146.3 C; 235/449; 360/126; 324/208, 207; 336/234, 45, 75

[56] References Cited

U.S. PATENT DOCUMENTS

| | | | |
|---|---|---|---|
| 2,939,920 | 6/1960 | Leilich | 360/126 |
| 3,271,718 | 9/1966 | Shaw | 336/234 |
| 4,132,980 | 1/1979 | Zabler | 324/208 |

Primary Examiner—Thomas A. Robinson
Attorney, Agent, or Firm—Frishauf, Holtz, Goodman & Woodward

[57] ABSTRACT

To provide a rugged vibration and shock-insensitive position transducer, a coil is wound on a lamella-like carrier which has a body element of electrically insulating material on which, at least on one surface, a foil of magnetically highly permeable material is positioned; these lamella-foil combinations can be stacked, or a unitary body which foils on both sides can be provided. A short-circuit ring, movable along the core, changes the inductance of the coil wound thereon, the value of which can be determined by energizing the coil with alternating current.

12 Claims, 5 Drawing Figures

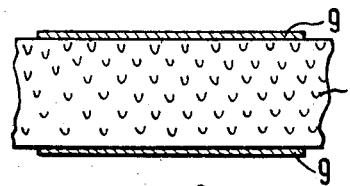
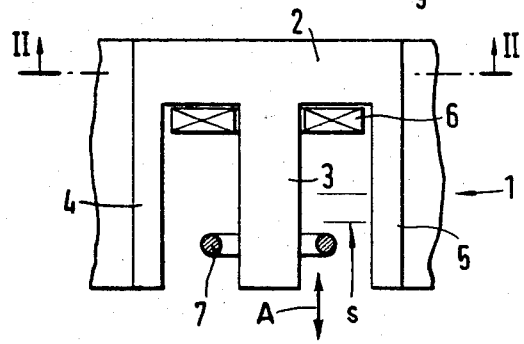
FIG. 2
FIG. 1
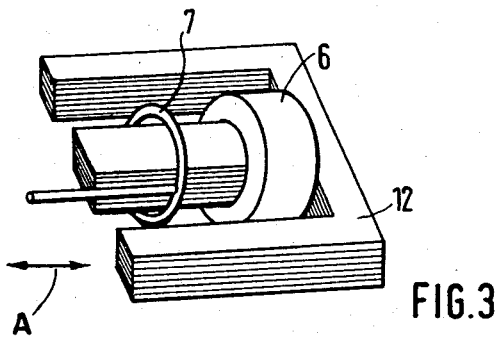
FIG. 3
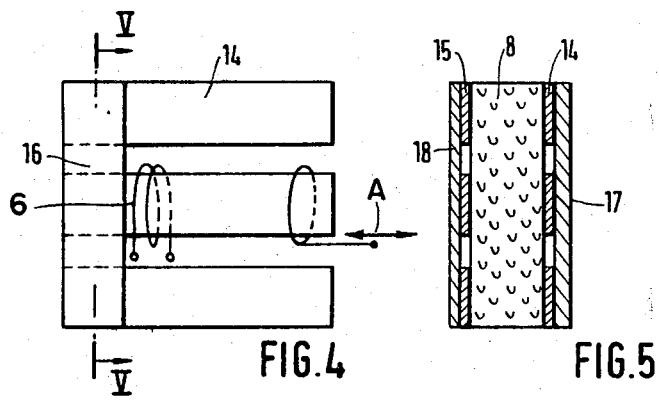
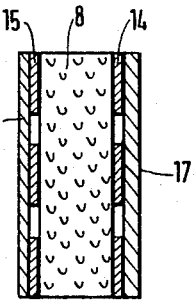
FIG. 4
FIG. 5

POSITION-ELECTRICAL SIGNAL TRANSDUCER

The present invention relates to a transducer apparatus to provide an electrical output signal representative of the positioning of an element, that is, to obtain an electrical signal which senses motion of a component, for example and especially for sensing the position of a control or supervisory element coupled to an internal combustion engine.

BACKGROUND

Position-electrical signal transducers having a magnetically conductive core on which a coil is placed and through which alternating current is passed are known. A short-circuit ring is placed on the core which is coupled to the element, the position of which is to be determined. The short-circuit ring is at least in part coupled to the electromagnetic flux generated by the coil. It is moved in a plane transverse to the plane defined by the ring or coil.

Various types of short-circuit coil or ring transducers use cores of stacked sheet metal lamellae, separated from each other by a layer, usually a thin layer, of non-magnetizable and electrically insulating material. Typical separating layers are paper, a lacquer or varnish, or the like. These transducers are comparatively bulky and often lack sensitivity, that is, fail to provide a measurable change in output signal upon small displacements of the short-circuit coil or ring. Additionally, the stacked laminar construction is subject to loosening in use, especially when the transducer is installed in mobile equipment, for example in an automotive vehicle, where it is subject to shock and vibration, as well as to widely varying temperature conditions.

THE INVENTION

It is an object to provide a transducer having low mass and high sensitivity, so that even small displacements of a short-circuit ring will result in clearly measurable change in the inductivity of the supply winding wound on a core.

Briefly, in accordance with the invention, the core at least in part is made of a core body of electrically insulating material which, at least on one of its surfaces and preferably on both, carries a foil of magnetically highly permeable material. Thus, the core is magnetically conductive and includes, at least in part, a lamella-like body element which is made of the electrically non-conductive material and on which the highly permeable foil is placed.

DRAWINGS

FIG. 1 is a top view of a transducer in schematic form;

FIG. 2 is a cross-sectional view through the core of the transducer of FIG. 1;

FIG. 3 is a perspective view of the transducer;

FIG. 4 is a top view of another embodiment of the transducer; and

FIG. 5 is a cross-sectional view taken along lines V—V of FIG. 4.

The transducer has a generally E-shaped core 2 with a center leg 3 and two outer legs 4, 5. A coil 6 is secured to the center leg 3. Alternating current is applied to the coil 6 to generate a magnetic field. This magnetic field is magnetically coupled to a short-circuit ring 7, placed over the center leg 3 and movable in a plane transverse to the plane of the ring, as schematically indicated by arrow A. The ring 7 preferably is clear from the center leg 3 and does not make contact therewith. The ring 7 is coupled to the element, the position of which is to be sensed, for example the control rod of a Diesel engine fuel injection pump. The positioning path, see dimension s (FIG. 1), in the direction of the arrow A thus can be determined by deriving an electrical output signal representative of the position of the ring 7 on the center leg of the core 3. Approach of the ring 7 to the coil 6 decreases the inductivity of the coil.

The frequency of the current passed through the coil 6 should be selected to be comparatively high. Eddy current losses in core 2 may thus arise, and in order to decrease these losses, the core 2 is made in the form of a lamella-like body or carrier 8 which, for example, may be a ceramic. The upper and lower surfaces each have a foil 9 applied thereto which is made of amorphous magnetically highly permeable material and secured to the carrier or lamella 8 by adhesion. FIG. 2 is a cross section taken along lines II—II of FIG. 1. The carrier 8 may also be made of glass, polyurethane, filamentary or textile-reinforced thermoplastic or thermosetting resin, or the like; polymethylacrylester is particularly suitable.

The foil 9 is preferably made of a material which includes the metals iron, nickel and cobalt, which have additives delaying crystallization so that, upon quenching from molten state, they will solidify in amorphous state. Typical examples for suitable soft magnetic amorphous materials are:

(1) Iron alloys, particularly $Fe_{82} B_{18}$
(2) Fe-Ni alloys, for example $Fe_{40} Ni_{40} B_{20}$, and
(3) Cobalt-nickel iron alloys, for example $Co_{50} Ni_{20} Fe_6 Si_{12} B_{12}$.

The amorphous metals have excellent magnetic properties. A substantial amount of material can be saved in comparison to customary cores made of stacked sheet metal lamellae. The short-circuit ring structure of FIGS. 1 and 2 is particularly suitable to determine small displacements or small angles, and permit supply of current at relatively high frequency to the coil 6. The eddy current losses in a transducer of the type illustrated are smaller by an order of magnitude than in transducers using customary stacked sheet metal cores, so that substantially higher frequencies can be used. This is of substantial advantage when the transducer is used to determine displacement of elements in an automotive vehicle, since then the mass of the transducer elements will be small, and only small space will be required to provide the transducer, while still resulting in output of high accuracy.

FIG. 3 illustrates a short-circuit ring transducer having an E-shaped core 12 which is built up of a plurality of lamella-like carriers 8, as illustrated in FIGS. 1 and 2. In contrast to FIG. 2, the lamella body 8 has the highly permeable foil 9 applied to only one surface side thereof, and adhesively connected to the lamella 8. The stacked arrangement then will provide alternate layers of the lamella 8 and the highly permeable foil 9.

FIG. 4 illustrates another embodiment in which an E-shaped magnetic core of a transducer is shown. FIG. 5 is a section through the yoke thereof. The amorphous metals are preferably made in the form of thin strips having a width of from between 3 to 8 mm. The carrier 8 is made of compressed or compacted resin, reinforced with textile material, for example of the type known in the trade as "Resitex". The upper side as well the lower side has three strips 14, 15 applied thereto which, within the region of the yoke 16, are transversely connected by further cross connecting strips 17, 18 to form the magnetically conductive closed magnetic circuit of the core.

The structure shown in FIGS. 4 and 5 is particularly advantageous since the small gap between the foils 14, 15 extending longitudinally along the legs of the yoke, and the cross strips 17, 18 along the yoke, will be minute - essentially only the thickness of the adhesive. The gaps between the strips 14, 15 along the legs and the strips 17, 18, along the yoke, thus will be small with respect to the substantially larger air gap in which the short-circuit ring 7 is movable. Thus, the gaps between the foils 14, 15 and the yoke strips 17, 18 can be effectively neglected.

Various changes and modifications may be made, and features described in connection with any one of the embodiments may be used with any of the others, within the scope of the inventive concept.

We claim:

1. Position-electrical signal transducer to provide an electrical output signal representative of displacement (A) of an element comprising
   a core including magnetically conductive material;
   a coil (6) wound on the core and adapted for connection to a source of alternating current;
   a movable short-circuit ring coupled to said element placed on the core and coupled, at least in part, to the magnetic field generated by the coil upon being energized, the short-circuit ring being movable in a direction transverse to the plane defined by the ring;
   and wherein, in accordance with the invention, the core comprises
   the combination of a carrier body (8) of electrically insulating material, and a foil or layer (9) of a material of high magnetic permeability located and supported on at least one surface of said carrier body.

2. Transducer according to claim 1, wherein the foil or layer (9) comprises an iron alloy.

3. Transducer according to claim 2, wherein the iron alloy is an amorphous metal alloy.

4. Transducer according to claim 3, wherein the iron alloy comprises $Fe_{82} B_{18}$.

5. Transducer according to claim 1, wherein the foil or layer (9) comprises an iron-nickel alloy.

6. Transducer according to claim 5, wherein the iron-nickel alloy comprises $Fe_{40} Ni_{40} B_{20}$.

7. Transducer according to claim 1, wherein the foil or layer (9) comprises a cobalt-nickel alloy.

8. Transducer according to claim 7, wherein the cobalt-nickel alloy comprises $Co_{50} Ni_{20} Fe_6 Si_{12} B_{12}$.

9. Transducer according to claim 1, wherein the core comprises an E-shaped structure, having three projecting legs and a yoke;
   said core structure being formed of said carrier body of electrically insulating material with said foil or layer extending in strip form along the legs of the E-shaped structure at both sides of the carrier body of electrically insulating material;
   and transverse strips (17, 18) of said foil or layer material on the yoke and extending over portions of the strips (14, 15) extending along the legs of the core structure.

10. Transducer according to claim 9, wherein said foils or layers are adhesively secured to the underlying electrically insulating material and, at the overlapping portions, to the respectively underlying strips of said foil or layer.

11. Transducer according to claim 9, wherein said strips (17, 18) extending along the yoke comprise amorphous ferrite.

12. Transducer according to claim 1, wherein said foil or layer (9) is adhesively secured to the underlying carrier body (8) of electrically insulating material.

* * * * *